US010025319B2

(12) United States Patent
Liu et al.

(10) Patent No.: US 10,025,319 B2
(45) Date of Patent: Jul. 17, 2018

(54) COLLISION-WARNING SYSTEM

(71) Applicant: Ford Global Technologies, LLC, Dearborn, MI (US)

(72) Inventors: Nanjun Liu, Ann Arbor, MI (US); Jerry H. Engelman, Plymouth, MI (US); Ahsan Qamar, Canton, MI (US); Timothy Drotar, Commerce Township, MI (US); Kun Deng, Ann Arbor, MI (US); Alex Maurice Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/252,389

(22) Filed: Aug. 31, 2016

(65) Prior Publication Data
US 2018/0059686 A1 Mar. 1, 2018

(51) Int. Cl.
G05D 1/02 (2006.01)
G08G 1/16 (2006.01)

(52) U.S. Cl.
CPC ......... *G05D 1/0289* (2013.01); *G05D 1/0214* (2013.01); *G05D 1/0223* (2013.01); *G08G 1/166* (2013.01)

(58) Field of Classification Search
None
See application file for complete search history.

(56) References Cited

U.S. PATENT DOCUMENTS

| 2,879,502 A * | 3/1959 | Miller ...................... F41G 7/00 114/20.1 |
| 4,317,119 A * | 2/1982 | Alvarez ............. G01S 13/9303 342/455 |
| 5,964,822 A | 10/1999 | Alland et al. |
| 6,826,479 B2 | 11/2004 | Miyahara |
| 6,832,156 B2 | 12/2004 | Farmer |
| 6,944,543 B2 * | 9/2005 | Prakah-Asante ..... B60R 21/013 180/167 |
| 7,016,782 B2 | 3/2006 | Schiffmann |
| 7,034,742 B2 | 4/2006 | Cong et al. |

(Continued)

FOREIGN PATENT DOCUMENTS

| CN | 104527638 A | 4/2015 |
| EP | 3007015 A1 | 4/2016 |
| JP | 2007279892 A | 10/2007 |

OTHER PUBLICATIONS

"3.4 Studies of Long-Term Advanced Systems (Task 2.3)", Automotive Collision Avoidance System (ACAS) Program Final Report DOT HS 809080, May 10, 1998.

(Continued)

*Primary Examiner* — Redhwan K Mawari
*Assistant Examiner* — Edward Torchinsky
(74) *Attorney, Agent, or Firm* — Frank A. MacKenzie; Bejin Bieneman PLC

(57) ABSTRACT

A controller includes a processor and a memory storing processor-executable instructions in a host vehicle. The processor is programmed to designate a target vehicle as a collision risk upon determining that an intersection angle between the host vehicle and the target vehicle is between preset lower and upper bounds and an absolute value of an azimuth angle rate of change of the host vehicle is below a preset threshold.

20 Claims, 4 Drawing Sheets

(56) References Cited

U.S. PATENT DOCUMENTS

| | | | |
|---|---|---|---|
| 8,095,313 B1 | 1/2012 | Blackburn | |
| 8,180,531 B2 | 5/2012 | Lucas et al. | |
| 8,577,550 B2 | 11/2013 | Lu et al. | |
| 9,187,091 B2* | 11/2015 | Mills | B60W 40/107 |
| 9,610,945 B2* | 4/2017 | Miller | B60W 30/08 |
| 2011/0246071 A1* | 10/2011 | Tsunekawa | G08G 1/166 |
| | | | 701/301 |
| 2016/0052515 A1 | 2/2016 | Choi et al. | |
| 2017/0039854 A1* | 2/2017 | Shibata | G08G 1/161 |

OTHER PUBLICATIONS

Search Report from United Kingdom Intellectual Property Office dated Jan. 31, 2018 regarding Application GB 1713486.7 (4 pages).

\* cited by examiner

COLLISION-WARNING SYSTEM

BACKGROUND

A vehicle may include sensors for tracking an external environment surrounding the vehicle. Some types of sensors are radar sensors, scanning laser range finders, light detection and ranging (LIDAR) devices, and image processing sensors such as cameras. The vehicle may include a vehicle controller in communication with the sensors, which uses output from the sensors to analyze the external environment, for example, defining features of a surrounding landscape, detecting roads and lanes of roads on the landscape, interpreting signs and signals, and tracking and classifying objects in the environment such as vehicles, cyclists, and pedestrians. For example, a vehicle controller may classify whether a detected object is another vehicle and provide state information about the other vehicle, such as location, speed, and heading. However, current systems for detecting and classifying collision risks are lacking.

DETAILED DESCRIPTION

Figure 1:
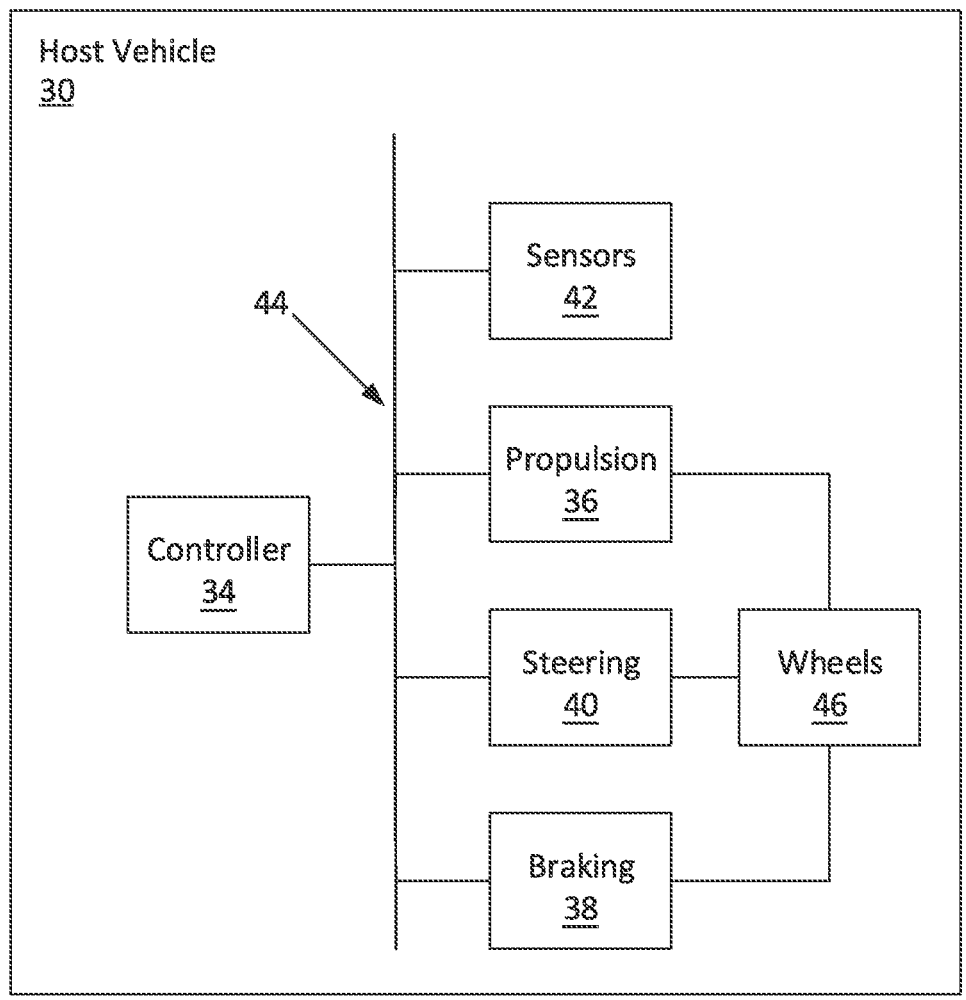
FIG. 1 is a block diagram of an example host vehicle.

With reference to the Figures, wherein like numerals indicate like parts throughout the several views, a controller 34 includes a processor and a memory storing processor-executable instructions in a host vehicle 30. The processor is programmed to designate a target vehicle 32 as a collision risk upon determining that an intersection angle β between the host vehicle 30 and the target vehicle 32 is between preset lower and upper bounds, and that an absolute value of an azimuth angle rate of change $d\theta/dt$ of the host vehicle 30 is below a preset threshold.

The controller 34 allows the host vehicle 30 to determine whether the target vehicle 32 is a collision risk and, if warranted, perform evasive maneuvers or warn a human driver of the collision risk. By relying on the intersection angle β and the azimuth angle rate of change $d\theta/dt$, the controller 34 determines the collision risk in a computationally efficient manner with a low amount of error and measurement noise. The computational efficiency may allow more frequent updating and thus more accurate tracking of the target vehicle 32.

The host vehicle 30 may be an autonomous vehicle. The controller 34, sometimes referred to as the "virtual driver," may be capable of operating the host vehicle 30 independently of the intervention of a human driver, to a greater or a lesser degree. The controller 34 may be programmed to operate the propulsion 36, braking 38, steering 40, and/or other vehicle systems.

The controller 34 is included in the vehicle-control system for carrying out various operations, including as described herein. The controller 34 is a computing device that generally includes a processor and a memory, the memory including one or more forms of computer-readable media, and storing instructions executable by the processor for performing various operations, including as disclosed herein. The memory of the controller 34 further generally stores remote data received via various communications mechanisms; e.g., the controller 34 is generally configured for communications on a controller area network (CAN) bus or the like, and/or for using other wired or wireless protocols, e.g., Bluetooth, etc. The controller 34 may also have a connection to an onboard diagnostics connector (OBD-II). Via a vehicle network using Ethernet, WiFi, the CAN bus, Local Interconnect Network (LIN), and/or other wired or wireless mechanisms, the controller 34 may transmit messages to various devices in the vehicle and/or receive messages from the various devices, e.g., controllers, actuators, sensors 42, etc., e.g., controllers and sensors 42 as discussed herein. For example, the controller 34 may receive data from sensors 42. Although one controller 34 is shown in FIG. 1 for ease of illustration, it is to be understood that the controller 34 could include, and various operations described herein could be carried out by, one or more computing devices.

The host vehicle 30 may include the sensors 42. The sensors 42 may detect internal states of the vehicle, for example, wheel speed, wheel orientation, and engine and transmission variables. The sensors 42 may detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 42 may detect the external world, for example, radar sensors, scanning laser range finders, light detection and ranging (LIDAR) devices, and image processing sensors such as cameras. The sensors 42 may include communications devices, for example, vehicle-to-infrastructure (V2I) or vehicle-to-vehicle (V2V) devices.

The controller 34 may transmit and receive signals with the sensors 42, the steering 40, the propulsion 36, and the braking 38 through a communications network 44 such as a controller area network (CAN) bus, Ethernet, Local Interconnect Network (LIN), and/or by any other wired or wireless communications network.

The steering 40 controls the turning of wheels 46. The steering 40 is in communication with and receives input from a steering wheel and the controller 34. The steering 40 may be a rack-and-pinion system with electric power-assisted steering, a steer-by-wire system, as are both known in the art, or any other suitable system.

The propulsion 36 of the host vehicle 30 generates energy and translates the energy into motion of the host vehicle 30. The propulsion 36 may be, for example, a conventional powertrain including an internal-combustion engine coupled to a transmission that transfers rotational motion to the wheels 46; an electric powertrain including batteries, an electric motor, and a transmission that transfers rotational motion to the wheels 46; a hybrid powertrain including elements of the conventional powertrain and the electric powertrain; or any other type of propulsion. The propulsion 36 is in communication with and receives input from the controller 34 and from a human driver. The human driver may control the propulsion 36 via, e.g., an accelerator pedal and/or a gear-shift lever.

The braking 38 resists the motion of the host vehicle 30 to stop the vehicle. The braking 38 may be friction brakes such as disc brakes, drum brakes, band brakes, and so on; regenerative brakes; any other suitable type of brakes; or a combination. The braking 38 is in communication with and receives input from the controller 34 and a human driver.

The human driver may control the braking 38 via, e.g., a brake pedal.

Figure 2:
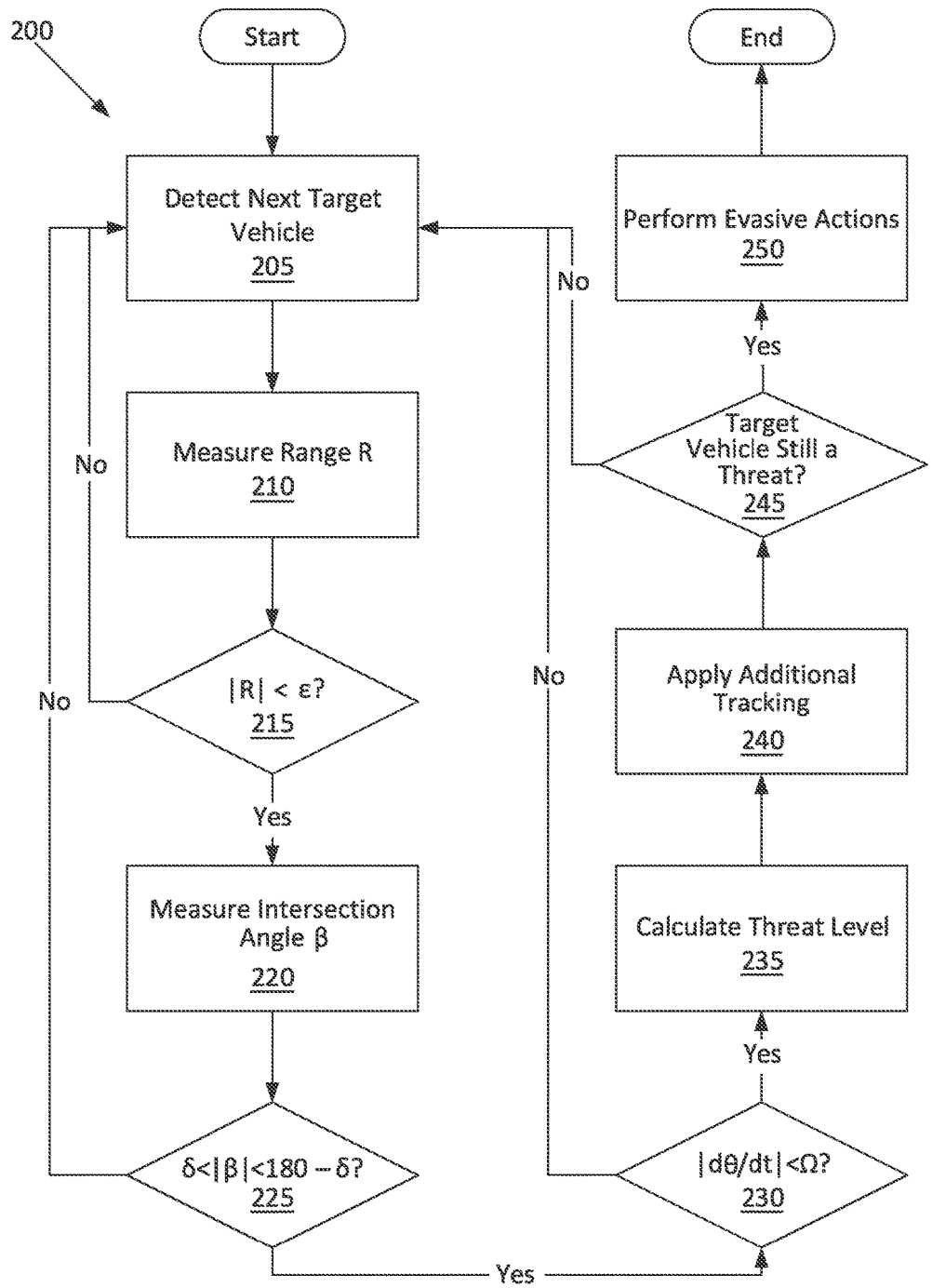
FIG. 2 is a process flow diagram of an example process of identifying a collision risk of a target vehicle.
Figure 3:
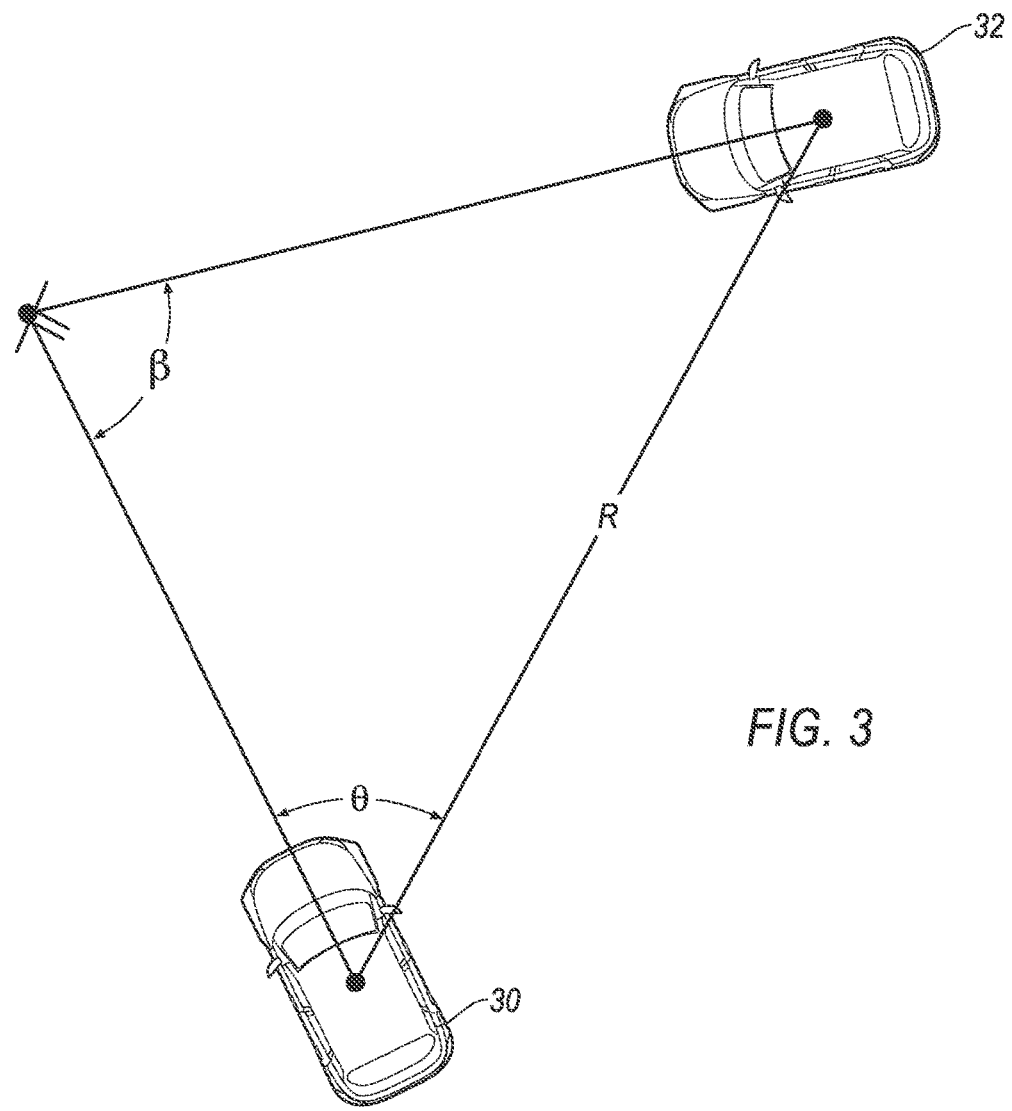
FIG. 3 is a diagram of an example interaction between the host vehicle and the target vehicle.

FIG. 2 is a process flow diagram illustrating an exemplary process 200 for identifying a collision risk of the target vehicle 32. As shown in FIG. 3, the host vehicle 30 and the target vehicle 32 have heading directions that may cross at an intersection angle β. The host vehicle 30 has an azimuth angle θ between the heading of the host vehicle 30 and a line from the host vehicle 30 to the target vehicle 32. A range R is the distance between the host and target vehicles 30, 32.

With reference to FIG. 2, the process 200 begins in a block 205, in which the controller 34 detects the target vehicle 32, which is not among objects that the controller 34 has previously detected. The target vehicle 32 is a discrete object in the external environment that the controller 34 determined is likely to be a vehicle based on, e.g., size, shape, etc., such determinations being known.

Next, in a block 210, the controller 34 measures the range R from the host vehicle 30 to the target vehicle 32, that is, a distance between the vehicles 30, 32, using signals from the sensors 42.

Next, in a decision block 215, the controller 34 determines whether the target vehicle 32 is within a preset range ε of the host vehicle 30. In other words, the controller 34 measures whether the absolute value of the range R is less than the preset range ε. The preset range ε is established by experimentation and/or simulations to, for example, determine a distance at which the target vehicle 32 presents sufficient risk of a collision to merit further tracking. If the target vehicle 32 is outside the preset range ε, the process 200 proceeds back to the block 205 to detect the next target vehicle 32.

If the target vehicle 32 is within the preset range ε of the host vehicle 30, next, in a block 220, the controller 34 measures the intersection angle β between the host vehicle 30 and the target vehicle 32. The intersection angle β is an angle between the current headings of the host and target vehicles 30, 32, as shown in FIG. 3.

Next, in a decision block 225, the controller 34 designates the target vehicle 32 as a collision risk upon determining that the intersection angle β between the host vehicle 30 and the target vehicle 32 is between the preset lower and upper bounds. The preset lower bound may be greater than zero degrees. The preset upper bound may be less than 180 degrees. For example, the preset upper bound may be less than 180 degrees by the amount of the lower bound, δ, making the preset lower and upper bounds δ and 180-δ, respectively. When the intersection angle β is too close to zero or 180°, then the azimuth angle rate of change dθ/dt may become too sensitive to measurement noise, possibly making the use of the azimuth angle rate of change dθ/dt in the decision block 230 below unreliable. Specifically, the difference in time to the intersection point is proportional to the azimuth angle rate of change dθ/dt, and the proportion is described by $$\left| \frac{1}{\tan\theta} - \frac{1}{\tan(\theta + \beta)} \right|,$$

the value of which is close to zero when the intersection angle β is close to zero or 180°, which increases the sensitivity of measurements. The preset lower and upper bounds may be determined experimentally using measurement sensitivity of the sensors 42. For example, preset lower and upper bounds may be 15° and 165°, respectively. If the intersection angle β is not between the preset lower and upper bounds, the process 200 proceeds back to the block 205 to detect the next target vehicle 32.

If the intersection angle β is between the preset lower and upper bounds, next, in the decision block 230, the controller 34 determines whether an absolute value of the azimuth angle rate of change dθ/dt of the host vehicle 30 is below a preset threshold Ω. The preset threshold Ω is set by experimentation and/or simulations to, for example, determine a value that presents enough risk of a collision to merit evasive actions or further evaluation for evasive action. The value of the threshold Ω will depend on the responsiveness of evasive-action systems of the host vehicle 30 and the measurement noise of the sensors 42; slower responsiveness or higher measurement noise imply a larger value of the threshold Ω. The threshold Ω may be a function of the range R. For example, the threshold Ω may be smaller for larger values of the range R to allow only a target vehicle 32 with a similar time to intersection to pass, and the threshold Ω may be larger for smaller values of the range R to allow more target vehicles 32 to pass. If the absolute value of the azimuth angle rate of change dθ/dt is above the preset threshold Ω, the process 200 proceeds back to the block 205 to detect the next target vehicle 32.

If the absolute value of the azimuth angle rate of change dθ/dt is below the preset threshold Ω, next, in the block 235, the controller 34 calculates a threat level based on the preset threshold Ω and the azimuth angle rate of change dθ/dt of the host vehicle 30. The threat level is a function of the preset threshold Ω and the azimuth angle rate of change dθ/dt. For example, the threat level may be a ratio of the preset threshold Ω to the absolute value of the azimuth angle rate of change dθ/dt, calculated as Ω/|dθ/dt|.

Next, in a block 240, the controller 34 confirms the collision risk independently of the azimuth angle rate of change of the host vehicle 30. The controller 34 may use one or more algorithms for tracking objects detected by cameras, radar, lidar, etc. Such algorithms for additional tracking are known.

Next, in a decision block 245, the controller 34 determines whether to designate the target vehicle 32 as a threat. The controller 34 may take into account the threat level as calculated in the block 235 as well as outputs from the additional tracking as performed in the block 240. If the target vehicle 32 is no longer designated as a threat, the process 200 proceeds back to the block 205 to detect the next target vehicle 32.

If the target vehicle 32 is still considered a threat, next, in a block 250, the controller 34 controls a vehicle subsystem to evade the target vehicle 32. The controller 34 controls the vehicle subsystem to evade the target vehicle 32 if the target vehicle 32 is designated as a collision risk in the decision block 230 and if the collision risk is confirmed independently of the azimuth angle rate of change of the host vehicle 30 in the decision block 245. Alternatively, the controller 34 may control the vehicle subsystem to evade the target vehicle 32 if the target vehicle 32 is designated as a collision risk in the decision block 230 without using the additional determination from the decision block 245. The vehicle subsystem may be, e.g., braking 38 or steering 40. Controlling the vehicle subsystem may include, e.g., instructing brakes to brake or instructing the steering system to turn. Alternatively, if the host vehicle 30 is not autonomous or is not being driven autonomously, the controller 34 may warn a human driver of the collision risk. After the block 250, the process 200 ends.

Figure 4A:
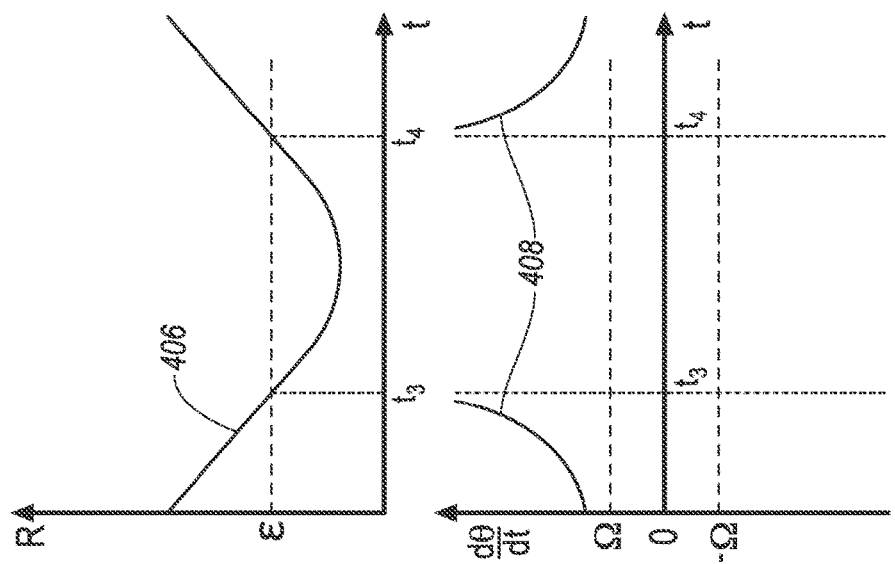
FIGS. 4A and 4B are example graphs of simulations of the host and target vehicles approaching each other showing a range and an azimuth angle rate of change versus time.
Figure 4B:
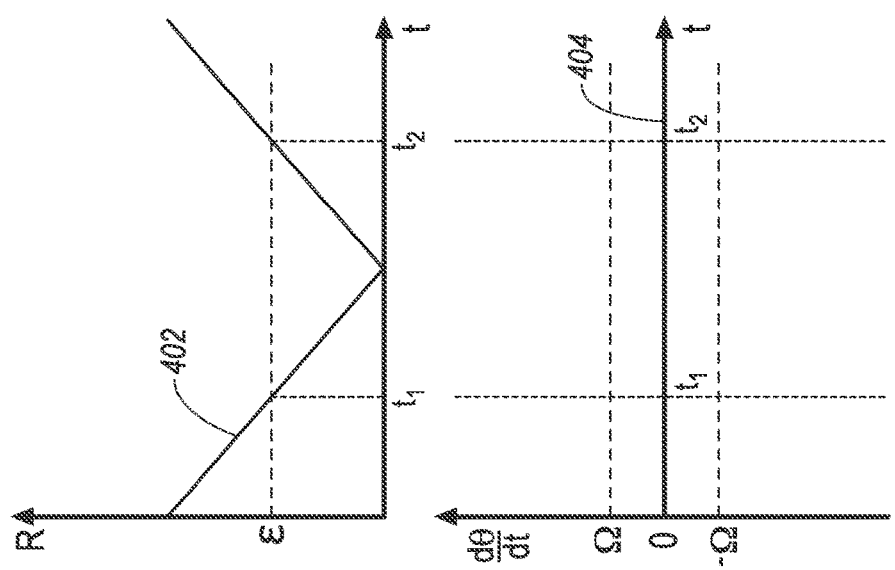

FIGS. 4A and 4B are graphs from two simulations of the host and target vehicles 30, 32 approaching each other showing the range R and the azimuth angle rate of change dθ/dt versus time t. In the two simulations, the intersection angle β is set to a constant value between the preset lower and upper bounds. In FIG. 4A, a range curve 402 crosses the preset range ε at times $t_1$ and $t_2$. Between the times $t_1$ and $t_2$, an azimuth-angle-rate-of-change curve 404 is between the negative of the preset threshold −Ω and the preset threshold Ω, in other words, the absolute value of the azimuth-angle-rate-of-change curve 404 is below the preset threshold Ω, indicating a higher risk of collision. In that simulation, the range R decreases to zero, meaning a collision occurred. In FIG. 4B, a range curve 406 crosses the preset range ε at times $t_3$ and $t_4$. Between the times $t_3$ and $t_4$, an azimuth-angle-rate-of-change curve 408 is greater than the preset threshold Ω, indicating a lower risk of a collision.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A controller comprising a processor and a memory storing processor-executable instructions in a host vehicle such that the processor is programmed to:
   designate a target vehicle as a collision risk upon determining that
      an intersection angle between the host vehicle and the target vehicle is between preset lower and upper bounds and
      an absolute value of an azimuth angle rate of change of the host vehicle is below a preset threshold; and
   control a vehicle subsystem to evade the target vehicle if designated as a collision risk.

2. The controller of claim 1, wherein the processor is further programmed to determine whether the target vehicle is within a preset range of the host vehicle.

3. The controller of claim 1, wherein the preset lower bound is greater than zero degrees.

4. The controller of claim 3, wherein the preset upper bound is less than 180 degrees.

5. The controller of claim 1, wherein controlling the vehicle subsystem includes instructing brakes to brake.

6. The controller of claim 1, wherein controlling the vehicle subsystem includes instructing a steering system to turn.

7. The controller of claim 1, wherein the processor is further programmed to confirm the collision risk independently of the azimuth angle rate of change of the host vehicle.

8. The controller of claim 1, wherein the processor is further programmed to instruct a vehicle subsystem to evade the target vehicle if designated as a collision risk and if the collision risk is confirmed independently of the azimuth angle rate of change of the host vehicle.

9. The controller of claim 1, wherein the processor is further programmed to calculate a threat score based on the preset threshold and the azimuth angle rate of change of the host vehicle.

10. A method comprising:
    designating a target vehicle as a collision risk upon determining that
       an intersection angle between a host vehicle and the target vehicle is between preset lower and upper bounds and
       an absolute value of an azimuth angle rate of change of the host vehicle is below a preset threshold; and
    controlling, by a computer controller, a vehicle subsystem to evade the target vehicle if designated as a collision risk.

11. The method of claim 10, further comprising determining whether the target vehicle is within a preset range of the host vehicle.

12. The method of claim 10, wherein the preset lower bound is greater than zero degrees.

13. The method of claim 12, wherein the preset upper bound is less than 180 degrees.

14. The method of claim 10, wherein controlling the vehicle subsystem includes instructing brakes to brake.

15. The method of claim 10, wherein controlling the vehicle subsystem includes instructing a steering system to turn.

16. The method of claim 10, further comprising confirming the collision risk independently of the azimuth angle rate of change of the host vehicle.

17. The method of claim 10, further comprising instructing a vehicle subsystem to evade the target vehicle if designated as a collision risk and if the collision risk is confirmed independently of the azimuth angle rate of change of the host vehicle.

18. The method of claim 10, further comprising calculating a threat score based on the preset threshold and the azimuth angle rate of change of the host vehicle.

19. A controller comprising a processor and a memory storing processor-executable instructions in a host vehicle such that the processor is programmed to:
    designate a target vehicle as a collision risk upon determining that
       an intersection angle between the host vehicle and the target vehicle is between preset lower and upper bounds and
       an absolute value of an azimuth angle rate of change of the host vehicle is below a preset threshold; and
    instruct a vehicle subsystem to evade the target vehicle if designated as a collision risk and if the collision risk is confirmed independently of the azimuth angle rate of change of the host vehicle.

20. The controller of claim 19, wherein instructing the vehicle subsystem includes at least one of instructing brakes to brake and instructing a steering system to turn.

* * * * *